Feb. 25, 1930. A. ANDERBERG ET AL 1,748,821
RAILWAY BRAKE OPERATED BY FLUID PRESSURE
Filed March 21, 1928
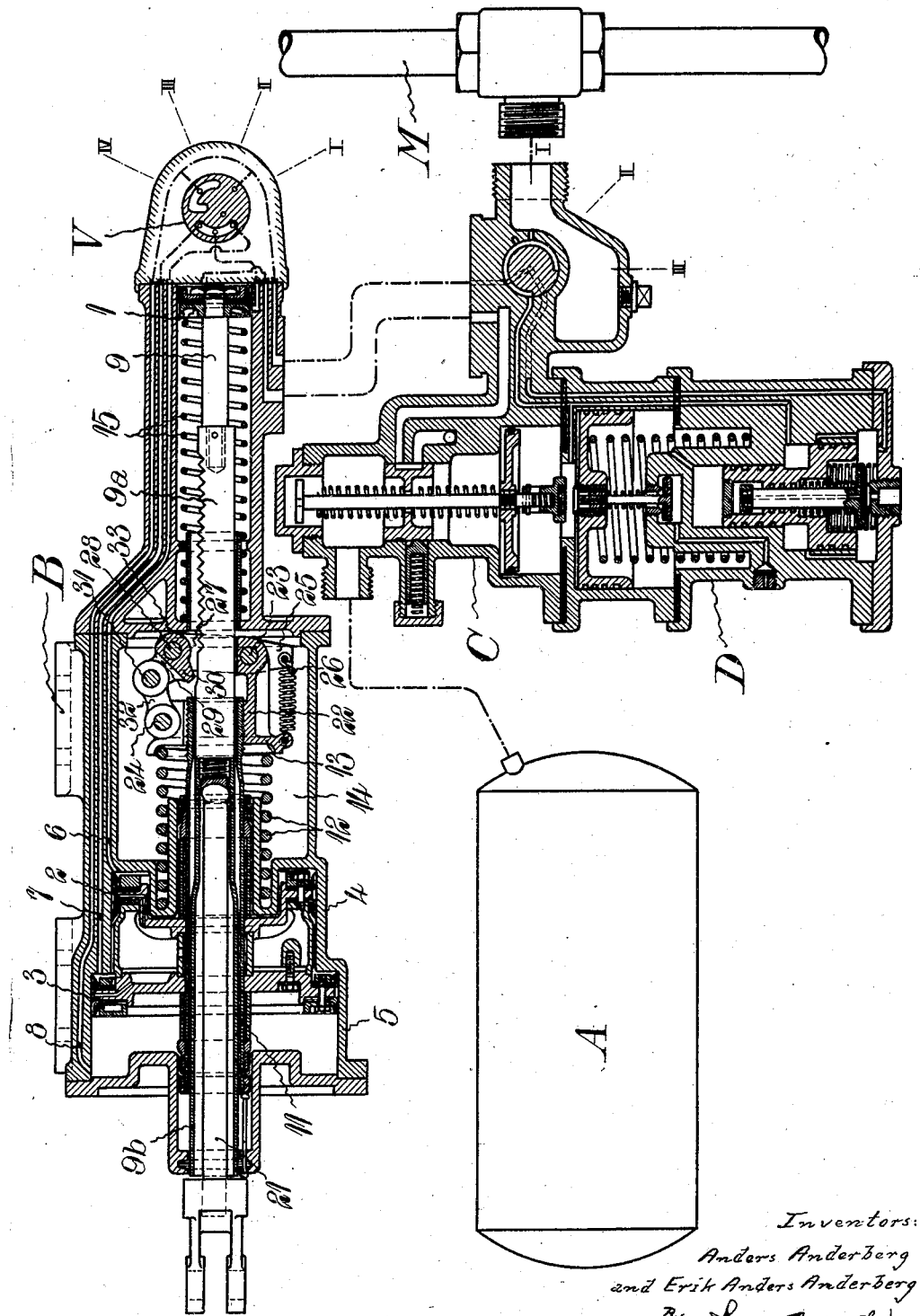
Inventors:
Anders Anderberg
and Erik Anders Anderberg Patented Feb. 25, 1930

1,748,821

UNITED STATES PATENT OFFICE

ANDERS ANDERBERG AND ERIK ANDERS ANDERBERG, OF MALMO, SWEDEN, ASSIGNORS TO CARL HOLMBERGS MEKANISKA, VERKSTADS AKTIEBOLAG, OF LUND, SWEDEN, A CORPORATION OF SWEDEN

RAILWAY BRAKE OPERATED BY FLUID PRESSURE

Application filed March 21, 1928, Serial No. 263,336, and in Sweden March 28, 1927.

Our invention relates to improvements in railway brakes actuated by fluid pressure, in which brakes the actuating fluid generally consists of compressed air. More specifically our invention relates to that type of brakes disclosed in our prior Patent No. 1,663,579, granted March 27, 1928, and comprising two operating devices of different types, one of them being a quick-action brake having a relatively small braking power and employed mainly for advancing the brake shoes towards the wheels, the other being a modified form of a two-chamber compressed air brake and employed for applying the main braking pressure to the shoes.

The present invention has for its object to simplify and improve the means for mounting the two brake devices together, and generally the intention is to reduce the dimensions of the whole brake structure especially in the direction of length, i. e. in the direction of the braking movement.

In our prior patent referred to above we have explained that the main brake device, i. e. the modified two-chamber compressed air brake, may consist of two or more pistons having different areas in order to make it possible, by using one or more of such pistons, to vary the braking action of each different car in a train according to the load carried by the different cars, and in such instance the invention involves certain special advantages as will be more fully described in the following.

The invention is diagrammatically illustrated in the accompanying drawing which shows a sectional elevation of the same.

Referring to the drawing the general reference letter A represents the auxiliary reservoir and M is the main brake pipe. B is the combined brake structure and C the triple valve, which latter is drawn to a very much larger scale than the other parts. The pipe connections between the different parts of the assembly are diagrammatically shown in dot and dash lines. Further it is to be understood that the triple valve C is shown in combination with the accelerating and other devices D described in our copending applications Nos. 243,134 and 245,540 filed, respectively, December 28, 1927, and January 29, 1928; and it is immaterial to the present invention whether such devices are mounted on the triple valve or not.

In the embodiment of invention shown in the drawing the quick-action brake comprises a single-chamber air brake having a piston 1 secured to the piston rod 9, which extends centrally through the piston of the modified two-chamber brake.

For the purpose of making it possible to dispense with the tightening means between the different pistons of the two-chamber brake and for reducing the dimension in the direction of length, the piston of the said two-chamber brake is given the form of a differential piston having a smaller sized part 2 and a larger sized part 3, which piston parts are rigidly connected to each other and tightened in the corresponding shaped cylinder against pressures in both directions, the tightening means being of the usual kind and well known to those skilled in the art. The cylinder, within which the differential piston moves, consists of two differently sized parts, i. e. a smaller sized cylinder 4 directly connected to a larger sized cylinder 5.

It will be obvious that the differential piston may also be made of more than two differently sized parts if desired, under the condition that the corresponding cylinder is provided with a corresponding number of different diameters, but for all practical purposes a two-part differential piston will be entirely sufficient.

The smaller cylinder 4 is provided with an air inlet 6 at that end facing the quick-action braking device and the larger sized cylinder 5 is provided with an inlet at each end, such inlets being designated 7 and 8.

The valve member V controlling the inlets 6, 7 and 8 as well as the inlet to the quick-action brake is arranged at the free end of the latter. Such valve structure is described in our previously-mentioned prior patent and requires no special description in this connection. For the sake of clearness, it is drawn to a larger scale than the brake structure itself, and in practice it is very much smaller than indicated by the proportions shown in the drawing.

The differential piston 2, 3 is arranged on a sleeve 11 surrounding the piston rod 9 of the quick-action brake.

For the purpose of reducing the axial dimensions the return spring 12 of the two-chamber brake is not arranged in the usual way within the cylinder of said brake, but it is arranged externally of the same between the piston 2 and a washer 13 affixed to the sleeve 11, and is placed within a housing 14 connecting the two different brakes.

With regard to the return spring 15 of the quick-action brake 1, it is arranged in the usual manner surrounding the piston rod.

The piston rod 9 according to the drawing consists of three different parts comprising an ordinary rod-like part 9 nearest to the piston, an intermediate serrated part $9^a$ and an outer sleeve-shaped part $9^b$, all these parts being rigidly connected to each other. The intermediate serrated part $9^a$ is secured in the inner end of the sleeve-shaped part $9^b$ and the latter surrounds a connecting rod 21 for connection with the brake rigging, such rod being loosely inserted within the sleeve $9^b$ and abutting against the adjacent end of the intermediate part $9^a$ the abutting surfaces preferably being rounded as indicated in the drawing.

The locking device between the different pistons consists of one or more knee link systems for coaction with the serrated part $9^a$ of the piston rod, and in the case of two or more such systems being used the part $9^a$ is to be provided with a corresponding number of serrated or rack-like portions.

The sleeve 11 penetrating the two-chamber brake piston within the chamber 14 is provided with a head 22, a part of which forms the washer 13 described above; and this head, at opposite sides of the piston rod part $9^a$, is provided with pivot pins 23 and 24. The pin 23 carries a two-armed lever, one arm 25 of which is connected by means of a tension spring 26 to a fixed point on the head 22 located adjacent to the washer 13, the other arm 27 carrying a pivot pin 28 for one link 29 of the aforementioned knee link system, such link being provided with a pawl 30 for coaction with the corresponding toothed rack. The other end of the link 29 is connected by means of a pivot pin 31 to the second link 32 of the knee link system, which lastmentioned link is pivotally mounted on the pin 24 described above. In order to obtain the desired operation it is also essential that a fixed abutment be placed in the path of movement of the knee link system; and in the construction shown, such abutment is formed at 33 by the cover of the housing 14 nearest to the quick-action brake.

The mode of operation is as follows:—

When the two-chamber brake performs its working stroke, moving to the left in the drawing, the head 22 takes part in the movement. The lever arm 27 then tends to move away from the fixed abutment 33, but then the spring 26 tilts the same in a clockwise direction and straightens out the knee link system 29, 32, so that the pawl 30 enters into engagement with the toothed rack portion $9^a$, thereby locking the pistons together. When the two-chamber brake piston moves in the opposite direction (releasing the brakes), the release of the locking means will take place in the reverse manner as soon as the lever arm 27 comes in contact with the fixed abutment 33.

It is to be seen from the drawing that the pawl 30 has been given a working edge, the sides of which are disposed substantially at right angles to each other, and at an angle of about 45° to the axis of the piston rod when engaging the latter, the serrations of the part $9^a$ being of a corresponding shape. Hence, the pressure acting on the two-chamber brake piston will automatically tend to press the pawl against the piston rod when it has once been brought into engagement by means of the spring 26 and a correct inclination of the coacting surfaces of the pawl and the rack will entirely unload the spring, so that the same need not be relied on for maintaining the locking action between the members described. Further, the construction may also be carried out in such a way that the lost-motion of the two-chamber brake piston for establishing the locking action is very small and without importance.

What we claim and desire to secure by Letters Patent is:—

1. In a fluid-actuated railway brake, two operating devices of different kinds acting upon a common piston rod, one of said devices consisting of a brake actuator having quick action and relatively small braking power, while the other consists of a two-chamber air brake actuator provided with a differential piston reciprocably mounted within a corresponding cylinder, means for connecting the said cylinder at the outer side of the piston part having the greater area with the main pipe, and means for independent connection of the cylinder at the opposite side of the said piston and at the outer side of the piston having the smaller area with the auxiliary reservoir.

2. In a fluid-actuated railway brake, two operating devices of different kinds acting upon a common piston rod, one of said devices consisting of a brake actuator having quick action and relatively small braking power, while the other consists of a two-chamber air brake actuator provided with a differential piston reciprocably mounted within a corresponding cylinder, a toothed rack combined with the common piston rod, a pawl combined with the differential piston and adapted for coaction with said toothed rack for releasably locking the differential piston to the same, means for establishing the locking action at the beginning of the working stroke of the differential piston, and means for releasing the same at the return stroke of said piston.

3. In a fluid-actuated railway brake, two operating devices of different kinds acting upon a common piston rod, one of said devices consisting of a brake actuator having quick action and a relatively small braking power, while the other consists of a two-chamber air brake actuator provided with a differential piston reciprocably mounted within a corresponding cylinder, a toothed rack combined with the common piston rod, a pawl combined with the differential piston and adapted for a releasable locking connection with the said toothed rack, a sleeve member connected with the differential piston and penetrating the centre of the same and surrounding the common piston rod, an intermediate housing connecting the two operating devices, a flange-shaped member affixed to said sleeve member and located within said housing, and a return spring for the differential piston interposed between said flange-shaped member and a wall of said housing.

4. In a fluid-actuated railway brake, two different operating devices of different kinds acting upon a common piston rod adapted for connection with the brake rigging, one of said devices consisting of a brake actuator having quick action and a relatively small braking power, while the other consists of a two-chamber air brake actuator provided with a differential piston reciprocably mounted within a corresponding cylinder, a toothed rack combined with the common piston rod, a sleeve member affixed to the differential piston and penetrating the centre of the same and surrounding the common piston rod, an intermediate housing connecting the two operating devices, a head on said sleeve member located within said intermediate housing, a knee link system pivotally connected with said head, one of the links of which forms a pawl for engagement with the aforesaid toothed rack, a lever connected with said knee link system and coacting with a fixed abutment within said housing for releasing the locking engagement between said pawl and said toothed rack at the return stroke of the differential piston, and a spring acting upon said lever for establishing the locking engagement at the working stroke of the differential piston.

5. In a fluid-actuated railway brake, two operating devices of different kinds acting upon a common piston rod, one of said devices consisting of a single-chamber air brake actuator having a relatively small braking power, while the other consists of a two-chamber air brake actuator provided with a differential piston reciprocably mounted within a corresponding cylinder, a toothed rack combined with the common piston rod, a pawl combined with the differential piston and adapted for coaction with the said toothed rack for releasably locking the differential piston to the same, means for establishing the locking action at the beginning of the working stroke of the differential piston, and means for releasing the same at the return stroke of said piston.

6. In a fluid-actuated railway brake, two operating devices of different kinds acting upon a common piston rod, one of said devices consisting of a single-chamber air brake actuator having a relatively small braking power, while the other consists of a two-chamber air brake actuator provided with a differential piston reciprocably mounted within a corresponding cylinder, an intermediate housing connecting the single-chamber air brake cylinder body with the cylinder body of the two-chamber air brake actuator, a sleeve member affixed to the differential piston and penetrating the centre of the same and extending into said intermediate housing, a toothed rack combined with the common piston rod, a locking pawl combined with the part of the sleeve member extending into said housing, means for establishing a locking engagement between said pawl and and said toothed rack at the beginning of the working stroke of the differential piston, and means for releasing said engagement at the return stroke of said piston.

7. In a fluid-actuated railway brake, two operating devices of different kinds acting upon a common piston rod, one of said devices consisting of a single-chamber air brake actuator, the piston of which is secured to said piston rod, while the other consists of a two-chamber air brake actuator having a differential piston adapted to be releasably connected with said common piston rod and reciprocably mounted within a corresponding differential cylinder, a toothed rack combined with the common piston rod, a pawl combined with the differential piston and adapted for coaction with said toothed rack, means for establishing the locking engagement between said pawl and said toothed rack at the beginning of the working stroke of the differential piston, and means for releasing said locking engagement at the return stroke of said piston.

In testimony whereof we have signed our names to this specification.

ANDERS ANDERBERG.
ERIK ANDERS ANDERBERG.